United States Patent
Yao et al.

(10) Patent No.: US 9,732,283 B2
(45) Date of Patent: *Aug. 15, 2017

(54) SYSTEM FOR INTEGRATED CATALYTIC CRACKING WITH ETHANOL CONVERSION TO FUEL

(71) Applicant: PHILLIPS 66 COMPANY, Houston, TX (US)

(72) Inventors: Jianhua Yao, Bartlesville, OK (US); William D. Henning, Bartlesville, OK (US); Walter E. Alvarez, Bartlesville, OK (US)

(73) Assignee: PHILLIPS 66 COMPANY, Houston, TX (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/964,749

(22) Filed: Dec. 10, 2015

(65) Prior Publication Data

US 2016/0186074 A1    Jun. 30, 2016

Related U.S. Application Data

(60) Provisional application No. 62/096,911, filed on Dec. 26, 2014.

(51) Int. Cl.
*B01J 8/00* (2006.01)
*B01J 8/16* (2006.01)
(Continued)

(52) U.S. Cl.
CPC .............. *C10G 11/18* (2013.01); *C10G 3/57* (2013.01); *C10G 2300/1011* (2013.01); *C10G 2300/1096* (2013.01); *Y02P 30/20* (2015.11)

(58) Field of Classification Search
CPC ....... B01J 8/00; B01J 8/16; B01J 19/00; B01J 19/24; B01J 2208/00796; C10G 3/00;
(Continued)

(56) References Cited

U.S. PATENT DOCUMENTS 5,481,057 A * 1/1996 Bell .......................... C07C 2/58
585/314
7,994,377 B2    8/2011 Coupard et al.
(Continued)

FOREIGN PATENT DOCUMENTS

WO    2012174205 A1    12/2012

OTHER PUBLICATIONS

Calsavara, Valmir et al; Transformation of ethanol into hydrocarbons on ZSM-5 zeolites modified with iron in different ways, Fuel, 2008, 1628-1636, 87, Science Direct, Brazil.

*Primary Examiner* — Natasha Young
(74) *Attorney, Agent, or Firm* — Phillips 66 Company

(57) ABSTRACT

System relating to the conversion of ethanol in a stripper unit of a fluidized catalytic cracking system. An ethanol stream comprising at least 4 volume percent water mixes with a catalyst in the stripper unit under conditions of temperature that favor conversion of the ethanol to hydrocarbons, thereby increasing incorporation of ethanol into liquid transportation fuels without exceeding regulatory limits on fuel vapor pressure. Certain embodiments additionally combine the ethanol stream with a hydrocarbon stream in the stripper and react in the presence of a catalyst to produce hydrocarbons that may have an increased boiling point, increased octane rating, decreased vapor pressure, decreased benzene content, or combinations of these properties.

10 Claims, 1 Drawing Sheet

(51) Int. Cl.
  *B01J 19/00* (2006.01)
  *B01J 19/24* (2006.01)
  *C10G 3/00* (2006.01)
  *C10G 11/00* (2006.01)
  *C10G 11/14* (2006.01)
  *C10G 11/18* (2006.01)

(58) Field of Classification Search
  CPC . C10G 3/54; C10G 3/57; C10G 11/00; C10G 11/14; C10G 11/18; C10G 2300/00; C10G 2300/10; C10G 2300/1011; C10G 2300/1096; Y02P 30/00; Y02P 30/20
  See application file for complete search history.

(56) References Cited

U.S. PATENT DOCUMENTS

| | | | |
|---|---|---|---|
| 8,552,241 B2 | 10/2013 | Coupard et al. | |
| 2013/0131415 A1* | 5/2013 | Butler | C07C 2/864 |
| | | | 585/323 |
| 2016/0186077 A1* | 6/2016 | Yao | C10G 57/005 |
| | | | 585/323 |

* cited by examiner

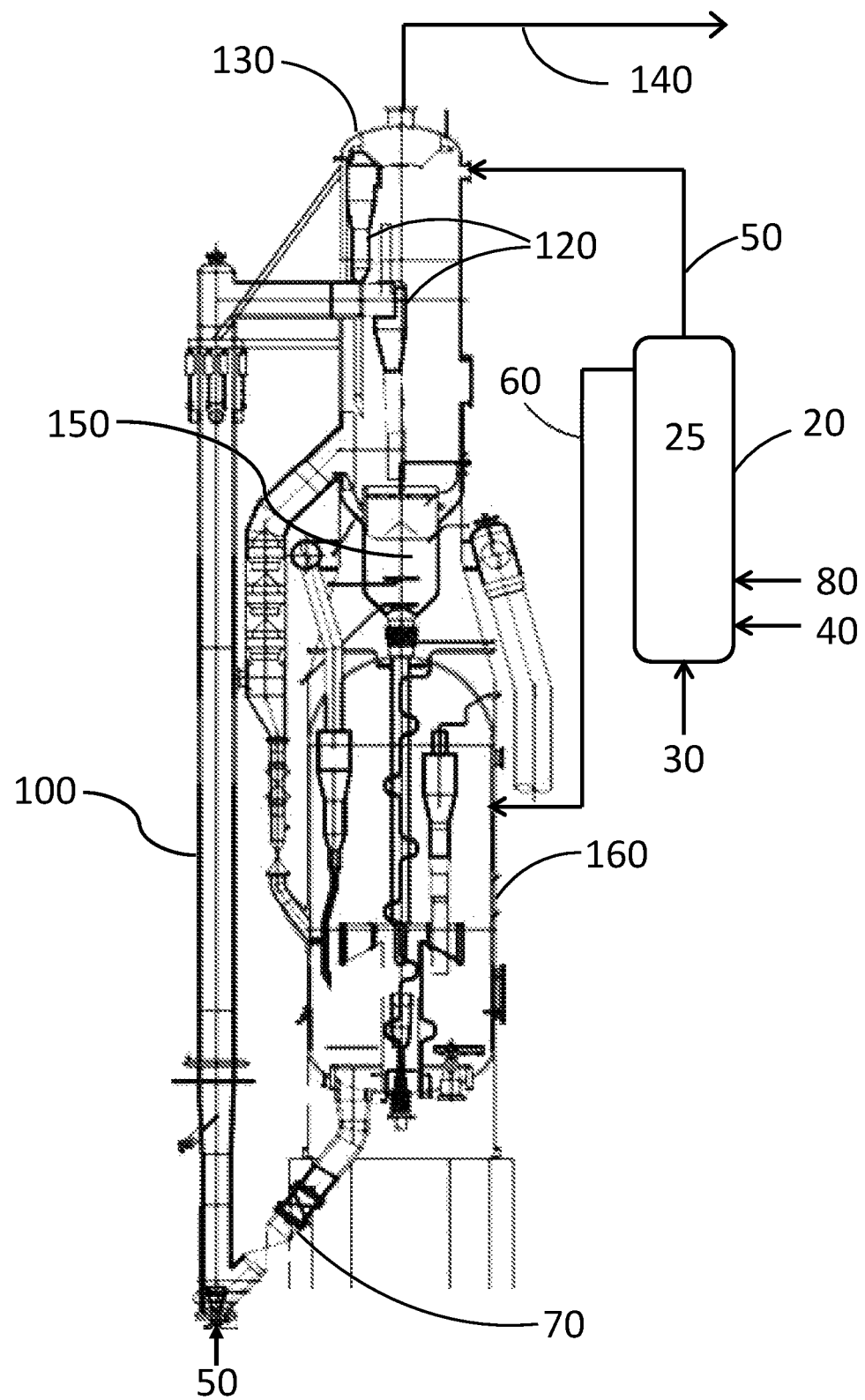

SYSTEM FOR INTEGRATED CATALYTIC CRACKING WITH ETHANOL CONVERSION TO FUEL

STATEMENT REGARDING FEDERALLY SPONSORED RESEARCH OR DEVELOPMENT

This application is a non-provisional application that claims the benefit of and priority to U.S. Provisional Application Ser. No. 62/096,911 filed Dec. 26, 2014, titled "System For Integrated Catalytic Cracking with Ethanol Conversion to Fuel", which is hereby incorporated by reference in its entirety.

BACKGROUND OF THE INVENTION

US government mandates have required increasing quantities of biomass-derived ethanol to be blended into transportation fuels. Due to concurrent reductions in US gasoline production and consumption, the quantity of ethanol blended into gasoline may soon exceed 10%, which may have implications for the operability of certain older vehicles not designed to utilize such fuels. Additionally, blending of increasing quantities of biomass-derived ethanol into fuels can increase the overall Reid vapor pressure to levels that exceed government mandated levels.

Thus, a need exists for new methods and systems that allow increased incorporation of biomass-derived ethanol into liquid transportation fuels, while preserving the suitability of the resulting fuel for use in most vehicles and maintaining an acceptable Reid vapor pressure of the fuel.

BRIEF SUMMARY OF THE DISCLOSURE

Certain embodiments of the inventive system comprise a system for converting ethanol to liquid transportation fuels, comprising: 1) a catalyst; 2) an ethanol stream; 3) a hydrocarbon stream; 4) a conversion unit that is operable at a temperature between about 260° C. and about 550° C. and comprises at least a first inlet that receives the catalyst, a second inlet that receives the ethanol stream and a third inlet that receives the hydrocarbon stream, where the arrangement of the first inlet and the second inlet facilitate rapid mixing of the catalyst with the ethanol stream and the hydrocarbon stream, where the conversion unit receives and facilitate reacting of the ethanol stream and the hydrocarbon stream with the catalyst to produce a mixed product stream comprising hydrocarbons having an increased average molecular weight relative to the hydrocarbon stream; 5) a fluidized catalytic cracking unit, comprising: a riser configured to crack a petroleum derived feedstock to produce a cracked hydrocarbon stream, a reactor main body configured to receive the mixed product stream from the conversion unit and separate the mixed product stream from the catalyst and a regenerator configured to combust coke deposits accumulated on the catalyst to produce a regenerated catalyst. In certain embodiments of the system, the conversion unit further comprises a first outlet operable to discharge a mixed product stream comprising hydrocarbons and catalyst to the reactor.

In certain embodiments of the system, the ethanol stream comprises water, wherein the conversion unit is operable to convert the water to steam, thereby preventing contact between the water and the catalyst. In certain embodiments of the system, the ethanol stream is derived from biomass and comprises at least 4 weight percent of water.

In certain embodiments of the system, the hydrocarbon stream comprises at least one of cracked hydrocarbons, light olefins or benzene. In certain embodiments of the system, the hydrocarbon stream comprises at least one of cracked hydrocarbons produced in the riser, a hydrocarbon fraction produced in a fractionator that separates the mixed product stream.

BRIEF DESCRIPTION OF THE DRAWINGS

A more complete understanding of the present invention and benefits thereof may be acquired by referring to the follow description taken in conjunction with the accompanying drawings in which:

FIG. 1 is a schematic diagram depicting one embodiment of a system and process for converting ethanol to liquid fuels in a conversion reactor located upstream from a fluidized catalytic cracking unit (FCCU).

The invention is susceptible to various modifications and alternative forms, specific embodiments thereof are shown by way of example in the drawings. The drawings may not be to scale. The drawing and its accompanying detailed description are not intended to limit the scope of the invention to the specific embodiment. The present disclosure is intended to cover all modifications, equivalents and alternatives falling within the spirit and scope of the present invention as defined by the appended claims.

DETAILED DESCRIPTION

Various exemplary embodiments of the inventive processes and systems will now be described in more detail. Certain embodiments pertain to the conversion of biomass-derived ethanol to transportation fuels in a conversion unit located upstream from an FCCU. Certain embodiments additionally pertain to co-converting a mixture comprising an ethanol stream and a hydrocarbon stream, where the hydrocarbon stream is optionally cracked hydrocarbons produced in a Fluidized Catalytic Cracking (FCC) riser, a highly-aromatic hydrocarbon fraction obtained from a fractionator that separates hydrocarbons cracked in the FCCU, or combinations thereof. The inventive processes and systems effectively allow incorporation of greater quantities of biomass-derived ethanol into liquid transportation fuels without raising the final ethanol content of the finished fuel above about 10 weight percent, and without increasing the Reid vapor pressure of the finished fuel to levels deemed unacceptable by government regulations.

FIG. 1 details components of an exemplary process and system. A conversion unit 20 comprising an internal reaction zone 25 accepts and facilitates contact between an ethanol stream 30 and a fresh catalyst 40 to facilitate conversion of the ethanol stream 30 by the catalyst 40 to a mixed product stream 50 comprising hydrocarbons that is conveyed to the reactor (or separation vessel) 130 of an FCCU. The now spent catalyst 60 is either returned directly to the regenerator 160, or may be conveyed along with the mixed product stream 50 to reactor 130, where it is separated from the mixed product stream 50 by cyclones 120 and eventually regenerated in the regenerator 160.

In the embodiment depicted in FIG. 1, the conversion unit 20 additionally receives a hydrocarbon stream 80 that mixes with the fresh catalyst 40 and the ethanol stream 30 in the reaction zone and is converted along with the ethanol stream 30 to produce the mixed product stream.

The general operation of an FCCU is well-understood in the art and will only be described herein to a level of detail that helps illustrate the improvements provided by the inventive systems and processes described herein. FCC is characterized by the use of a finely-divided silica/alumina based catalyst that is moved through the FCCU. A commercial-scale FCCU is a large-scale process and unit throughputs are typically in the range of about 10,000 to 130,000 barrels per day, which corresponds to catalyst circulation rates of 7 to 130 tons per minute. The catalyst particles typically utilized are of such a size that when "fluidized" with air or hydrocarbon vapor, the catalyst particles behave like a liquid and can be transported through pipes.

Again referring to FIG. 1, in the FCCU a petroleum-derived feedstock 50 and a regenerated catalyst 70 flow into a vertically-oriented riser 100 comprising a reaction zone where a majority of initial cracking reactions take place. The petroleum-derived feedstock 50 and the catalyst 70 mix and rise through the riser 100 as the petroleum-derived feedstock 50 is vaporized and cracked. Cracked vapors and the catalyst (which is now spent) leave via an outlet that is located proximate the upper portion of the riser 100, and are then separated as they pass through cyclones 120 located just downstream from the riser 100 in the reactor (or separation vessel) 130, which separates spent catalyst from the cracked vapors.

In the embodiment depicted in the FIGURE, the cracked vapors mix with the mixed product stream 50 coming from the conversion unit 25 to produce a second mixed product stream 140 that passes out of the reactor 130. The second mixed product stream 140 is then directed to enter one or more fractionating towers (not depicted), which fractionate the cracked vapors into light and heavy-cracked gas oils, cracked gasoline, and non-condensable, C1-C3 gases. Certain hydrocarbon fractions separated by the fractionator (not depicted) may possess a relatively high level of benzene that is unsuitable for blending into transportation fuels due to environmental regulations. Such hydrocarbon fractions may be suitable for feeding to the conversion unit 20 as hydrocarbon stream 80.

The ethanol stream 30 is optionally derived from biomass, in which case it may be produced from biomass via any known mechanism (such as, but not limited to, fermentation). Such production methods are conventional and outside the scope of the invention. In certain embodiments, the ethanol stream is a raw ethanol stream comprising at least 4 volume percent water. A raw ethanol stream is defined herein as an ethanol stream derived from biomass that comprises at least 4 volume percent of water.

In certain embodiments, prior to addition to the conversion unit, the fresh catalyst 40 is adjusted to a temperature that assists in altering the temperature within the conversion unit. For example, in one embodiment the temperature of the fresh catalyst may be lower than the temperature within the conversion unit, which causes quenching, or lowering of the temperature within the conversion unit. Quenching the conversion unit to a lower temperature may assist in optimizing the temperature to facilitate certain chemical reactions within the stripper unit. Alternatively, the fresh catalyst may be adjusted to a temperature that is higher than the temperature that is maintained within the conversion unit in order to help supply at least part of the heat required for a given conversion reaction.

Again referring to FIG. 1, the conversion unit 20 additionally comprises at least one inlet for the entry of fresh catalyst 40. The fresh catalyst serves to catalyze conversion of ethanol stream (and optionally a hydrocarbon stream 80) in the conversion unit to a mixed product stream that predominantly comprises hydrocarbons containing 4-15 carbon atoms and spent catalyst. The mixed product stream is then conveyed from the conversion unit along with spent catalyst to the reactor (or separation unit) 130 where it is separated from the spent catalyst by cyclones 120 or other conventional mechanisms that are outside the scope of the invention. The mixed product stream 60 is maintained in vapor phase and directed to a downstream fractionator (not depicted), which fractionates the cracked vapors by boiling point into light and heavy-cracked gas oils, cracked gasoline, jet fuel and diesel blendstock, $C_3$-$C_4$ products (sometimes called liquefied petroleum gasses, or LPG), and non-condensable gases including, but not limited to, $H_2$, $H_2S$, methane, and $C_2$ gases. Such fractionation methods are conventional and are outside the scope of the invention, and will not be discussed further.

In certain alternative embodiments, the hydrocarbon stream that is co-fed to the conversion unit along with the ethanol stream may be a fraction re-directed from the downstream fractionator that separates the mixed product stream (and cracked hydrocarbons produced by the FCCU) into various fractions according to their boiling point. The hydrocarbon stream advantageously comprises a fraction that comprises a large percentage of aromatic compounds. In these embodiments, the aromatic compounds are at least partially converted in the conversion unit to hydrocarbons that may possess an increased molecular weight, an increased boiling point, a decreased Reid vapor pressure, an increased octane rating, or combinations of more than one of these attributes.

While not wishing to be bound by theory, embodiments that mix a hydrocarbon stream and an ethanol stream together with a catalyst in a stripper unit may provide an advantage by facilitating increased chemical reactions between the hydrocarbon stream and the ethanol in the ethanol stream. In certain embodiments, this may serve to facilitate the conversion of benzene in the hydrocarbon stream to alkylaromatics, thereby decreasing the quantity of benzene in the mixed product stream. In certain embodiments, this conversion may facilitate an increase the octane rating of the mixed product stream comprising hydrocarbons, or decrease the Reid vapor pressure of the mixed product stream, or combinations of these effects.

The conversion unit is optionally maintained in a temperature range that is optimized to favor certain chemical reactions, such as (but not limited to) oligomerization, condensation and alkylation. For example, a conversion unit receiving only a feed of raw ethanol stream may be temperature-optimized for the catalyzed conversion of ethanol to C4-C15 hydrocarbons. Alternatively, a conversion unit may optionally be maintained within a temperature range to favor the alkylation of aromatics by ethanol. Alternatively, a conversion unit may be maintained within a temperature range to favor the reaction between olefins and ethanol to form C4-C15 hydrocarbons.

To accomplish these goals, the conversion unit may be maintained at a temperature ranging from 260° C. (500° F.) to 550° C. (1022° F.), optionally 315° C. (600° F.) to 510° C. (950° F.), optionally 650° F. to 950° F., optionally 550° F. to 800° F. 700° F. to 950° F., optionally 750° F. to 900° F., optionally 700° F. to 850° F., optionally 700° F. to 900° F., optionally 800° F. to 900° F., optionally 700° F. to 800° F. and a pressure ranging from about 1 to 145 psig (0.07 to 10 bar).

Referring again to FIG. 1, once the spent catalyst has been transported from the conversion unit to the FCC reactor 130, it is steam-stripped to remove hydrocarbons in the stripper unit 150, and eventually is transported to a regenerator 160, where coke is removed from the catalyst by controlled combustion in a conventional manner that is outside the scope of the invention. Regenerated catalyst 70 then enters the riser 100 via an inlet proximate the bottom portion of the riser 100 and in close proximity to the inlet for the petroleum-derived FCC feedstock 50. This allows the regenerated catalyst 70 to assist in vaporizing the fresh petroleum-derived FCC feedstock 50 just prior to cracking of the feedstock in the riser 100.

Optionally, the ethanol stream may comprise from 4 to 95 volume percent water, inclusive. In certain embodiments, the ethanol stream may comprise up to 5, 10, 15, 20, 30, 40, 50, 60, 70, 80, or even as much as 95 volume percent water, inclusive, without adversely affecting conversion of the ethanol stream to hydrocarbons by the catalyst (depending upon the sensitivity of the catalyst utilized to deactivation by water vapor). In certain embodiments, the wt. % of water in the ethanol stream may find an upper limit, although this upper limit may vary significantly depending upon the catalyst utilized and the conditions of temperature and pressure in each stripper unit.

In general, the temperature within the conversion unit is sufficient to prevent condensation of water that is present, including water that is fed to the stripper unit as a component of the raw ethanol stream. This prevents damage to the catalyst within the stripper unit, particularly if the catalyst comprises one or more metals. Alternatively, a certain quantity of water may be removed from the raw ethanol stream to produce a partially-processed ethanol stream prior to entering the stripper unit. Techniques for achieving this separation may include distillation, pervaporation (such as in the presence of a zeolite membrane) or any other conventional separation methodology.

The catalyst used in the conversion unit for any embodiment may comprise any catalyst that is capable of facilitating the cracking of large hydrocarbons into smaller hydrocarbons at a suitable temperature, while additionally capable of catalyzing the conversion of ethanol and/or hydrocarbons to produce larger hydrocarbons comprising four or more hydrocarbons. The catalyst is preferably resistant to the presence of water.

In certain embodiments, the catalyst may comprise any type of zeolite that is capable of catalyzing reactions between hydrocarbons to produce a higher molecular weight hydrocarbon. Such zeolites may be, but are not limited to, zeolites of one or more of the following categories: Y, X, MFI, FAU, beta, HY, EMT, USY, MOR, LTL BEA, MCM, ZSM, REY, REUSY and SAPO. The catalyst may also be impregnated with a metal, such as, for example, a rare earth metal, alkali metal, or alkaline earth metal. In certain embodiments, the aluminum of the zeolite structure can be totally or partially substituted by poor metals such as, for example, B, Ga, or Fe. An extensive characterization of such catalysts and structural or substituted variants is well known in the art.

The following examples are provided to better illustrate one or more of the various embodiments.

Example 1

Table 1 shows the selectivity of the ethanol conversion reaction towards production of C5+ hydrocarbons. A feed mixture comprising ethanol was fed at 2 g/hr (per 5 g catalyst) in the presence of a gaseous mix of $H_2/N_2/H_2O$ (ratio of 36/23/8 by volume). A zeolite catalyst ZSM-5 was contacted with the mixture at a temperature of 320° C. and 50 psig. The results (depicted in Table 1) demonstrated that production of hydrocarbons comprising five or more carbons (C5+) was highly-favored.

TABLE 1

| Product Selectivity from the Conversion of Ethanol to Hydrocarbons | |
|---|---|
| Ethanol Conversion (wt. %) | ~100 |
| Product Selectivity (wt. %) | |
| Methane | 0.0 |
| Ethane | 0.5 |
| Propane | 3.7 |
| Propylene | 1.3 |
| Butanes | 14.3 |
| Butenes | 2.9 |
| C5+ | 77.2 |
| Total, (wt. %) | ~100.0 |

Example 2

Table 2 provides an example of co-conversion between ethanol and the olefin ethylene, demonstrating the feasibility of embodiments where both an ethanol stream and a stream of hydrocarbons are fed to a conversion unit containing a zeolite catalyst. The table shows the product profile resulting from the co-conversion of the olefin ethylene (one example of a hydrocarbon produced in an FCC riser) and ethanol over a zeolite catalyst. A first feed comprised a mixture of ethylene/$H_2$/$N_2$/$H_2O$ (ratio of 33/36/23/8 by volume) fed with an ethylene weight hour space velocity (WHSV) of 1.0 $hr^{-1}$. A second feed was ethanol fed at 2 g/hr (per 5 g catalyst). The zeolite catalyst ZSM-5 was contacted with the mixture under the following conditions: 310° C., 0 psig, 1.0 $hr^{-1}$ (Ethylene WHSV), $H_2$/$N_2$/Ethylene/$H_2O$.

TABLE 2

| Product Selectivity from the Co-conversion of Ethylene and Ethanol to Hydrocarbons | |
|---|---|
| Ethylene Conversion (wt. %) | 86.5 |
| Ethanol Conversion (wt. %) | ~100 |
| Product Selectivity (wt. %) | |
| Methane | 0.0 |
| Ethane | 0.4 |
| Propane | 2.4 |
| Propylene | 5.3 |
| Butanes | 11.3 |
| Butenes | 11.2 |
| C5+ Products | 69.4 |
| Total (wt %) | 100.0 |

An advantage of the present processes and systems is that the fresh catalyst is added to the system via the conversion unit and is then transported from the conversion unit to the downstream fluidized catalytic cracking unit, wherein can serve to replenish old cracking catalyst. The conversion unit can be maintained at a temperature that favors reactions that upgrade the ethanol stream (optionally, a mixture of an ethanol stream and a hydrocarbon stream) to hydrocarbons comprising five or more carbon atoms that can be blended into transportation fuels.

An additional advantage of the inventive systems and processes disclosed herein is to avoid the need to separate water from the ethanol stream prior to feeding this stream to the conversion unit, as this would increase costs and reduce commercial viability of the system and process.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims, while the description, abstract and drawings are not to be used to limit the scope of the invention. The invention is specifically intended to be as broad as the claims below and their equivalents.

We claim:

1. A system for converting ethanol to liquid transportation fuels, comprising:
   a catalyst;
   an ethanol stream;
   a hydrocarbon stream;
   a conversion unit that is operable at a temperature between about 260° C. and about 550° C. and comprises at least a first inlet configured to receive the catalyst, a second inlet configured to receive the ethanol stream and a third inlet configured to receive the hydrocarbon stream,
      wherein the arrangement of the first inlet and the second inlet is configured to facilitate rapid mixing of the catalyst with the ethanol stream and the hydrocarbon stream,
      wherein the conversion unit is configured to receive and facilitate reacting of the ethanol stream and the hydrocarbon stream with the catalyst to produce a mixed product stream comprising hydrocarbons having an increased average molecular weight relative to the hydrocarbon stream; and
   a fluidized catalytic cracking unit comprising:
      a riser configured to crack a petroleum derived feedstock to produce a cracked hydrocarbon stream;
      a reactor main body configured to receive the mixed product stream from the conversion unit and separate the mixed product stream from the catalyst;
      a regenerator configured to combust coke deposits accumulated on the catalyst to produce a regenerated catalyst.

2. The system according to claim 1, wherein the ethanol stream comprises water, wherein the conversion unit is operable to convert the water to steam, thereby preventing contact between the water and the catalyst.

3. The system according to claim 2, wherein the ethanol stream is derived from biomass and comprises at least 4 weight percent of water.

4. The system according to claim 2, wherein the ethanol stream is derived from biomass and comprises at least 20 weight percent water.

5. The system according to claim 2, wherein the ethanol stream is derived from biomass and comprises at least 40 weight percent water.

6. The system according to claim 1, wherein the hydrocarbon stream comprises at least one of cracked hydrocarbons, light olefins or benzene.

7. The system according to claim 1, wherein the conversion unit further comprises a first outlet operable to discharge a mixed product stream comprising hydrocarbons and catalyst to the reactor.

8. The system according to claim 1, wherein the hydrocarbon stream comprises cracked hydrocarbons produced in the riser of the fluidized catalytic cracking unit.

9. The system according to claim 1, wherein the hydrocarbon stream is a fraction obtained from a fractionator located immediately downstream from the fluidized catalytic cracking unit.

10. The system according to claim 9, wherein the hydrocarbon stream comprises benzene.

* * * * *